(12) United States Patent
Yang et al.

(10) Patent No.: US 8,416,347 B2
(45) Date of Patent: Apr. 9, 2013

(54) METHOD AND APPARATUS OF AUTOMATICALLY SELECTING AUDIO FORMAT FOR OUTPUT SIGNAL OF A TUNER IN A TELEVISION SYSTEM

(75) Inventors: Chih-Yen Yang, Taichung (TW); Huan-Pin Tseng, Hsinchu (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 0 days.

(21) Appl. No.: 13/137,525

(22) Filed: Aug. 24, 2011

(65) Prior Publication Data

US 2012/0194739 A1    Aug. 2, 2012

(30) Foreign Application Priority Data

Jan. 28, 2011   (TW) .............................. 100103357 A

(51) Int. Cl.
*H04N 5/46*   (2006.01)
*H04N 5/455*  (2006.01)
*H04N 5/50*   (2006.01)

(52) U.S. Cl.
USPC ........................... 348/555; 348/726; 348/731

(58) Field of Classification Search .......... 348/731–733, 348/725–728, 555, 557, 558; *H04N 5/50, H04N 5/44, 5/455, 5/46*
See application file for complete search history.

(56) References Cited

U.S. PATENT DOCUMENTS

| 7,227,591 B2* | 6/2007 | Hwang et al. ................ 348/725 |
| 7,327,406 B2* | 2/2008 | Utsunomiya et al. ......... 348/731 |
| 8,218,092 B1* | 7/2012 | Cohen et al. .................. 348/726 |

* cited by examiner

*Primary Examiner* — Sherrie Hsia
(74) *Attorney, Agent, or Firm* — Bacon & Thomas, PLLC

(57) ABSTRACT

In a method of automatically selecting audio format for output signal of a tuner, a SAW filter is configured to a bandwidth of 5.5 MHz for filtering IF signal so as to generate CVBS signal and SSIF signal. Then, band-pass filters are used to detect a back porch of the CVBS signal thereby determining whether signal amplitude at a center frequency of 4.43 MHz is greater than that at a center frequency of 3.58 MHz. Finally, a bandwidth of 4.5 MHz is assigned to the SAW filter for filtering the intermediate frequency signal to re-generate the CVBS signal when the amplitude at 4.43 MHz is smaller than that at 3.58 MHz. Further, a video decoder decodes the CVBS signal to determine a video format from NTSC, PAL-M, and PAL-N formats, and an audio decoder decodes the SSIF signal to determine an audio format from MN, BG, DK, and I formats.

6 Claims, 6 Drawing Sheets

|  | NTSC-M | NTSC 4.43 | NTSC-J |
|---|---|---|---|
| Lines/Fields | 525/59.94 | 525/59.94 | 525/59.94 |
| Video Bandwidth | 4.2MHz | 4.2MHz | 4.2MHz |
| Audio Carrier | 4.5MHz | 4.5MHz | 4.5MHz |
| Channel Bandwidth | 6MHz | 6MHz | 6MHz |
| FH | 15.734KHz | 15.734KHz | 15.734KHz |
| FV | 59.94Hz | 59.94Hz | 59.94Hz |
| FSC | 3.579545MHz | 4.43MHz | 3.579545MHz |

FIG. 1 (Prior Art)

|  | PAL I | PAL D | PAL B | PAL N | PAL M | PAL Nc |
|---|---|---|---|---|---|---|
| Lines/Fields | 625/50 | 625/50 | 625/50 | 625/50 | 525/60 | 625/50 |
| Video Bandwidth | 5.5MHz | 6.0MHz | 5.0MHz | 5.0MHz | 4.2MHz | 4.2MHz |
| Audio Carrier | 6.0MHz | 6.5MHz | 5.5MHz | 5.5MHz | 4.5MHz | 4.5MHz |
| Channel Bandwidth | 8MHz | 8MHz | 7MHz | 6MHz | 6MHz | 6MHz |
| FH | 15.625KHz | 15.625KHz | 15.625KHz | 15.625KHz | 15.734KHz | 15.625KHz |
| FV | 50Hz | 50Hz | 50Hz | 50Hz | 59.94Hz | 50Hz |
| FSC | 4.43361875MHz | 4.43361875MHz | 4.43361875MHz | 4.43361875MHz | 3.57561149MHz | 3.58205625MHz |

FIG. 2 (Prior Art)

METHOD AND APPARATUS OF AUTOMATICALLY SELECTING AUDIO FORMAT FOR OUTPUT SIGNAL OF A TUNER IN A TELEVISION SYSTEM

CROSS REFERENCE TO RELATED APPLICATION

This application claims the benefits of the Taiwan Patent Application Ser. No. 100103357, filed on Jan. 28, 2011, the subject matter of which is incorporated herein by reference.

BACKGROUND OF THE INVENTION

1. Field of the Invention

The present invention relates to the technical field of TV tuners and, more particularly, to a method and apparatus of automatically selecting audio format for output signal of a tuner in a television system.

2. Description of Related Art

Currently, the popular formats for television (TV) signal include NTSC, PAL, SECAM, and so on. The NTSC format is also referred to as an N system, which is a color TV broadcasting standard defined by US National Television System Committee (NTSC) and essentially has two branches, NTSC-J and NTSC-US (also referring to as an NTSC-U/C).

The NTSC format has a frame rate of 29.97 frames/sec., 525 scan lines, a interlaced scanning mode, an aspect ratio of 4:3, and a resolution of 720×480. The NTSC format solves the compatibility of color broadcasting and monochrome broadcasting; however, the phase distortion and unstable color presentation exist in the NTSC format.

FIG. 1 is a schematic view illustrating the NTSC TV system parameters in the prior art. The letter M indicates monochrome standard for lines and field rates (525/59.94), a video bandwidth of 4.2 MHz, an audio carrier frequency of 4.5 MHz above the video carrier frequency, and an RF channel bandwidth of 6 MHz. In addition, the NTSC refers to the technique of adding color information to the monochrome TV signal.

The NTSC4.43 format is commonly used for multi-standard analog VCRs. The horizontal and vertical timings FH, FV of an NTSC4.43 image signal are identical to those of an NTSC-M image signal. The NTSC4.43 image signal has the same encoding as a PAL modulation format and a color subcarrier frequency of 4.43361875 MHz.

The NTSC-J format is used in Japan, and its horizontal and vertical timings are identical to those of the NTSC-M TV scheme.

In the 1950's, a color TV broadcasting was planning in Western Europe. In order to avoid the defects of the earlier developed NTSC TV signal format, including a color tone shifting being likely to occur at a poor receiving condition, different color TV formats suitable for Western Europe was developed, which are the PAL and SECAM formats TV image signal. FIG. 2 is a schematic view illustrating PAL TV system parameters in the prior art. The PAL and SECAM formats both have the same image frequency of 50 Hz to meet with the 50 Hz AC power used in Europe.

The PAL format was developed by the Telefunken company in West Germany in 1963. The BBC firstly applied the PAL format at a field trial of the BBC2 channel in 1964, and entirely used the color TV broadcasting to all channels in 1967. In 1967, the PAL format was first used for broadcasting on a color TV system in West Germany. In 1998, The ITU has defined the PAL format as "Recommendation ITU-R BT.470-6, Conventional Television Systems" formally.

The SECAM format indicates "sequential color transfer and store", which was developed successfully in France in 1966. For a signal transfer, a brightness signal is sent line by line, and two color difference signals in interleaved lines are sent sequentially; i.e., scanning the lines in interleaved can separate the transmission time so as to avoid the cross color artifact and associated color distortion in transmission. The SECAM format has higher interference tolerance and better color effect, but poor compatibility. The SECAM format uses a frame rate of 25 frames/sec., 625 scan lines in interleaved line scan, an aspect ratio of 4:3, and a resolution of 720×576.

Since different nations have different TV signal formats, decoding of the video and audio signals in a TV image signal becomes difficult. In known patents, U.S. Pat. No. 6,765,621 granted to Okada for a "Color system discriminator" has disclosed a frequency detector which only detects whether an audio signal is presented at 4.5 MHz, but not disclosed how to distinct a color subcarrier frequency presented at 4.43 MHz from the audio signal presented at 4.5 MHz.

When a tuner supports the NTSC358-M/BG/DK/I, NTSC443-BG/DK/I, PAL-M, PAL-BG/DK/I, and PAL-N formats, the color subcarrier frequencies of video signals of the NTSC443-BG/DK/I and PAL-BG/DK/I signals are around 4.5 MHz, and in this case an input signal around 4.5 MHz cannot be detected as a video or audio signal by directly comparing the amplitudes of signals around 4.5 MHz.

Therefore, it is desirable to provide an improved method and apparatus of automatically selecting audio format for output signal of a tuner in a television system, so as to mitigate and/or obviate the aforementioned problems.

SUMMARY OF THE INVENTION

Accordingly, the object of the present invention is to provide a method and apparatus of automatically selecting audio format for output signal of a tuner in a television system, which can automatically detect the audio format for the output signal of the tuner.

In accordance with one aspect of the invention, there is provided with a method of automatically selecting audio format for output signal of a tuner in a television system. The method comprises the steps of: (A) a video surface acoustic wave (SAW) filter converting a first intermediate frequency (IF) signal outputted by the tuner into a video intermediate frequency (VIF) signal based on a first configured bandwidth configured by a controller; an audio SAW filter converting the first IF signal into an sound intermediate frequency (SIF) signal under control of the controller; a demodulator demodulating the VIF signal to obtain a composite video baseband signal (CVBS) and demodulating the SIF signal to obtain a second sound intermediate frequency (SSIF) signal under control of the controller; (B) a video decoder having a first band-pass filter and a second band-pass filter simultaneously filtering the CVBS signal based on a center frequency configured by the controller, wherein the center frequency of the first band-pass filter is greater than the center frequency of the second band-pass filter; (C) the controller determining whether the CVBS signal at the back porch at the center frequency of the first band-pass filter has a signal amplitude greater than that of the second band-pass filter, and executing step (D) when the CVBS signal at the center frequency of the first band-pass filter has the signal amplitude greater than that of the second band-pass filter, otherwise executing step (E); (D) the controller controlling the first band-pass filter to detect a signal amplitude of the CVBS signal at a synchronous tip and a back porch and determining whether the signal amplitude of the CVBS signal at the back porch is greater than that at the synchronous tip, the video decoder being controlled by the controller to decode a received CVBS signal and to select one of NTSC443, PAL, and SECAM formats as a video format of the CVBS signal when the signal amplitude of the received CVBS signal at the back porch is greater than that at the synchronous tip, and the audio decoder being controlled by the controller to decode a received SSIF signal and to select one of BG, DK, and I formats as an audio format of the received SSIF signal when the signal amplitude of the received CVBS signal at the back porch is greater than that at the synchronous tip, otherwise executing step (F); (E) the video surface acoustic wave (SAW) filter converting the first intermediate frequency (IF) signal outputted by the tuner into the video intermediate frequency (VIF) signal based on a second configured bandwidth configured by the controller and decoding a second received CVBS signal to select one of NTSC, PAL-M, and PAL-N formats as a video format of the second received CVBS signal under control of the controller, and the audio SAW filter decoding a second received SSIF signal to select one of M, BG, DK, and I formats as an audio format of the second received SSIF signal under control of the controller; and (F) the video SAW filter converting the first IF signal outputted by the tuner into the VIF signal based on the second configured bandwidth, the video decoder decoding the second received CVBS signal to select one of NTSC, PAL-M, and PAL-N formats as the video format of the second received CVBS signal under control of the controller, the audio SAW decoder decoding the second received SSIF signal to select one of M and N formats as the audio format of the second received SSIF signal under control the controller.

In accordance with another aspect of the invention, there is provided with an apparatus of automatically selecting audio format for output signal of a tuner in a television system, which comprises: a tuner for receiving a radio frequency (RF) signal and converting the RF signal into a first intermediate frequency (IF) signal; a video surface acoustic wave (SAW) filter for converting the first IF signal into a video IF (VIF) signal based on a first configured bandwidth or a second configured bandwidth; an audio SAW filter for converting the first IF signal into a sound IF (SIF) signal; a demodulator for demodulating the VIF signal so as to generate a composite video baseband signal (CVBS) and demodulating the SIF signal so as to generate a second sound intermediate frequency (SSIF) signal; a video decoder for decoding the CVBS signal based on a center frequency for determining a video format of the CVBS signal, the video decoder including a first band-pass filter and a second band-pass filter, wherein the first band-pass filter and the second band-pass filter simultaneously filter the CVBS signal for output based on a center frequency, and the center frequency of the first band-pass filter is greater than the center frequency of the second band-pass filter; an audio decoder for decoding the SSIF signal to determine an audio format of the SSIF signal; and a controller connected to the tuner, the video SAW filter, the audio SAW, the demodulator, the first band-pass filter of the video decoder, the second band-pass filter of the video decoder, and the audio decoder for first configuring the video SAW filter to the first configured bandwidth, then configuring the video SAW filter to the second configured bandwidth when a signal amplitude at the center frequency of the first band-pass filter is smaller than or equal to that at the second band-pass filter for the CVBS signal, and finally controlling the video decoder to select one of NTSC, PAL-M, and PAL-N formats as a video format of a second received CVBS signal and controlling the audio decoder to select one of M, BG, DK, and I formats as an audio format of a second received SSIF signal. The controller controls the first band-pass filter to detect a signal amplitude of the CVBS signal at a synchronous tip and a back porch when the signal amplitude of the CVBS signal at the center frequency of the first band-pass filter is greater than that at the center frequency of the second band-pass filter. The controller controls the video decoder to decode the CVBS signal to select one of NTSC443, PAL, and SECAM formats as the video format of the CVBS signal and also controls the audio decoder to decode the SSIF signal to select one of BG, DK, and I formats as an audio format of a second received SSIF signal, when it is determined by the controller that the signal amplitude of the CVBS signal at the back porch is greater than that at the synchronous tip. The controller reconfigures the video SAW filter to the second configured bandwidth for controlling the video decoder to reselect one of NTSC, PAL-M, and PAL-N formats as the video format of the second received CVBS signal and controlling the audio decoder to reselect one of M and N formats as the audio format of the second received SSIF signal, when it is determined by the controller that the signal amplitude of the CVBS signal at the back porch is smaller than or equal to that at the synchronous tip.

Other objects, advantages, and novel features of the invention will become more apparent from the following detailed description when taken in conjunction with the accompanying drawings.

BRIEF DESCRIPTION OF THE DRAWINGS

FIG. 1 is a schematic view illustrating the NTSC TV system parameters in the prior art;

FIG. 2 is a schematic view illustrating the PAL TV system parameters in the prior art;

DETAILED DESCRIPTION OF THE PREFERRED EMBODIMENT

Reference will now be made in detail to present embodiments of the present invention, examples of which are illustrated in the accompanying drawings. Wherever possible, the same reference numbers will be used throughout the drawings to refer to the same or like parts.

The invention relates to a method and apparatus of automatically selecting audio format for output signal of a tuner. The method and apparatus of automatically selecting audio format for output signal of a tuner is applied in a television system.

Figure 3:
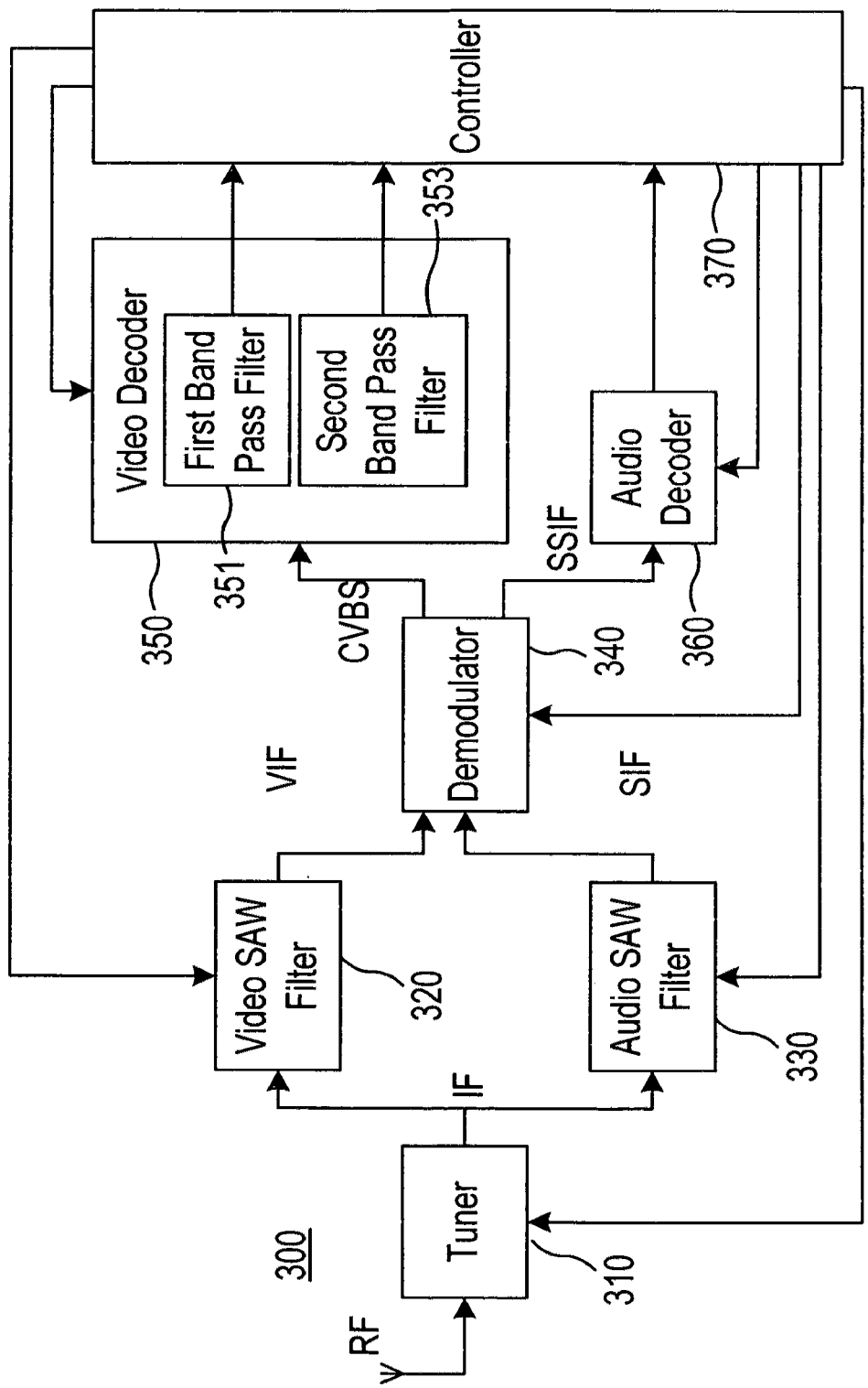
FIG. 3 is a system block diagram of an apparatus of automatically selecting audio format for output signal of a tuner in a television system in accordance with an embodiment of the invention.

FIG. 3 is a system block diagram of the apparatus of automatically selecting audio format for output signal of a tuner in a television system in accordance with an embodiment of the invention. The apparatus includes a tuner 310, a video surface acoustic wave (SAW) filter 320, an audio SAW filter 330, a demodulator 340, a video decoder 350, an audio decoder 360, and a controller 370.

The tuner 310 is controlled by the controller 370 to receive a radio frequency (RF) signal and convert the RF signal into a first intermediate frequency (IF) signal for being outputted to the video SAW filter 320 and the audio SAW filter 330.

The video surface acoustic wave (SAW) filter 320 converts the first IF signal into a video IF (VIF) signal based on a bandwidth configured by the controller 370, and outputs the VIF signal to the demodulator 340. The configured bandwidth can be a first configured bandwidth or a second configured bandwidth. Preferably, the first configured bandwidth is 5.5 MHz, and the second configured bandwidth is 4.5 MHz.

The audio SAW filter 330 is controlled by the controller 370 to convert the first IF signal into a sound IF (SIF) signal for being outputted to the demodulator 340.

The demodulator 340 is controlled by the controller 370 to demodulate the VIF signal to generate a composite video baseband signal (CVBS) for being outputted to the video decoder 350, and to demodulate the SIF signal to generate a second sound intermediate frequency (SSIF) signal for being outputted to the audio decoder 360.

The video decoder 350 decodes the CVBS signal based on a center frequency configured by the controller 370, so as to determine a video format of the CVBS signal. The video decoder 350 includes a first band-pass filter 351 and a second band-pass filter 353. The first band-pass filter 351 filters the received CVBS signal based on a first center frequency configured by the controller 370, so as to output a filtered CVBS signal. The second band-pass filter 353 filters the received CVBS signal based on a second center frequency configured by the controller 370 and outputs a filtered CVBS signal. The first center frequency is 4.43 MHz, and the second center frequency is 3.58 MHz.

The audio decoder 360 is controlled by the controller 370 to decode the received SSIF signal to thus determine an audio format of the SSIF signal.

The controller 370 is connected to the tuner 310, the video SAW filter 320, the audio SAW 330, the demodulator 340, the first band-pass filter 351 of the video decoder 350, the second band-pass filter 353 of the video decoder 350, and the audio decoder 360.

The controller 370 first configures a bandwidth of the video SAW filter 320 to the first configured bandwidth, and controls the first band-pass filter 351 to detect a signal amplitude of the CVBS signal at the synchronous tip and the back porch when the signal amplitude of the CVBS signal outputted by the first band-pass filter 351 is greater than that outputted by the second band-pass filter 353. When the signal amplitude of the CVBS signal at the back porch is greater than that at the synchronous tip, the controller 370 controls the video decoder 350 to decode the received CVBS signal in order to select one of NTSC443, PAL, and SECAM formats, and controls the audio decoder 360 to decode the received SSIF signal in order to select one of BG, DK, and I formats. When the signal amplitude of the CVBS signal at the back porch is smaller than or equal to that at the synchronous tip, the controller 370 reconfigures the video SAW filter 320 to the second configured bandwidth in order to control the video decoder 350 to decode a last received CVBS signal for selecting one of NTSC, PAL-M, and PAL-N formats as the video format, and to control the audio decoder 360 to decode a last received SSIF signal for selecting one of M and N formats as the audio format.

When the signal amplitude of the CVBS signal outputted by the first band-pass filter 351 is smaller than or equal to that outputted by the second band-pass filter 353, the controller 370 configures the video SAW filter 320 to the second configured bandwidth, controls the video decoder 350 to decode a last received CVBS signal in order to select one of NTSC, PAL-M, and PAL-N formats as the video format, and controls the audio decoder 360 to decode the received SSIF signal in order to select one of M, BG, DK, and I formats as the audio format.

In this embodiment, the CVBS signal received again by the video decoder 350 is another CVBS signal generated by demodulating the video IF signal generated after the video SAW filter 320 changes the bandwidth.

Figure 4:
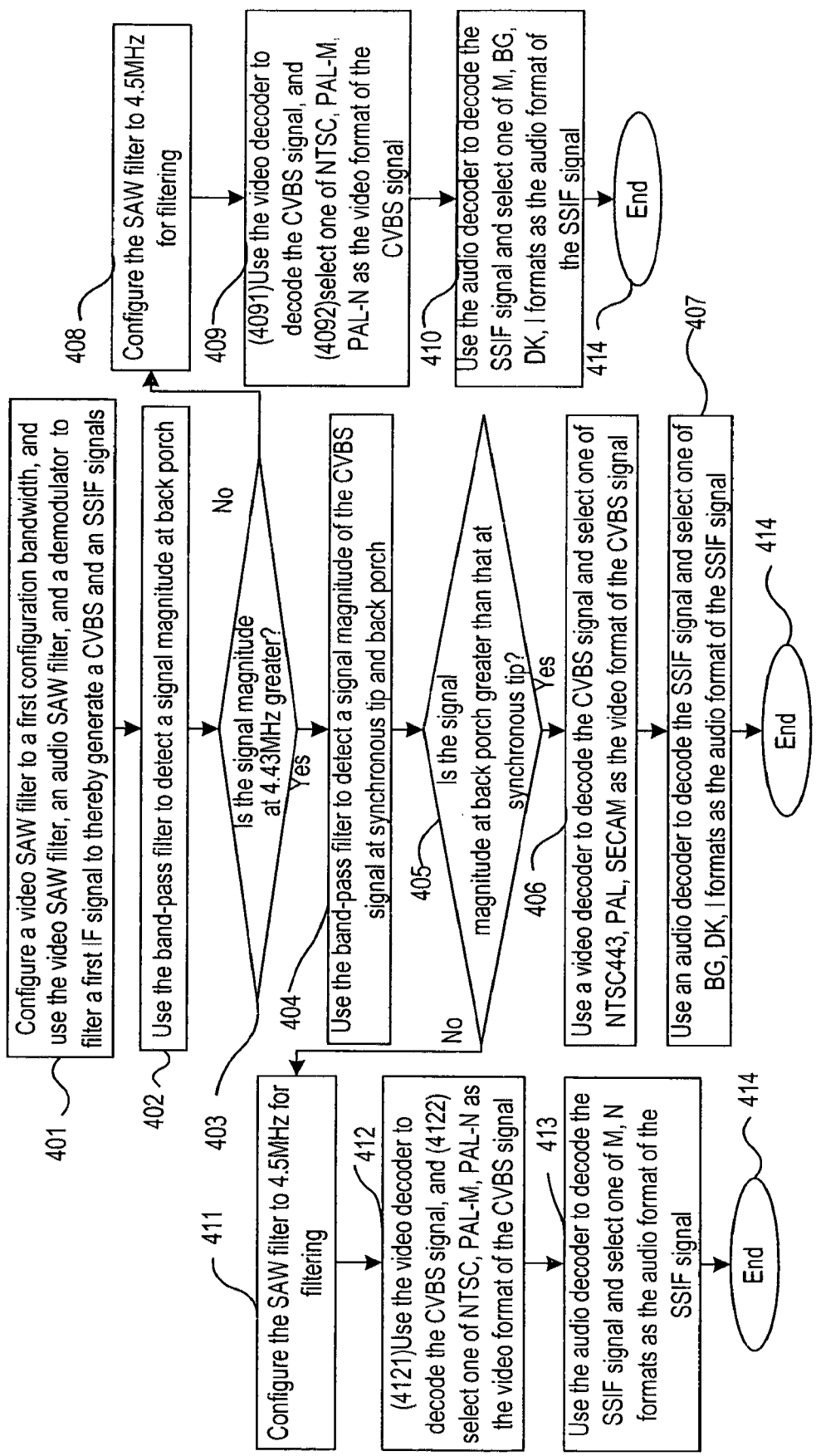
FIG. 4 is a flowchart for a method of automatically selecting audio format for output signal of a tuner in a television system in accordance with an embodiment of the invention.

FIG. 4 is a flowchart for the method of automatically selecting audio format for output signal of a tuner in a television system in accordance with an embodiment of the invention. The flowchart is described, in combination with FIG. 3, as follows.

In step 401, the video SAW filter converts a first IF signal into a video IF signal based on a first configured bandwidth; the audio SAW filter converts the first IF signal into an sound IF (SIF) signal; the demodulator demodulates the video IF signal to generate a CVBS signal and also demodulates the SIF signal to generate an SSIF signal.

In this step, the controller 370 configures the video SAW filter 320 to the first configured bandwidth, such that the video SAW filter 320 can use the first configured bandwidth to filter the first IF signal outputted by the tuner 310 to thus generate the video IF signal. The demodulator 340 is controlled by the controller 370 to demodulate the video IF signal and thus generate the CVBS signal for being outputted to the video decoder 350. The first configured bandwidth is 5.5 MHz. In addition, the audio SAW filter 330 is also controlled by the controller 370 to filter the first IF signal outputted by the tuner 310 and thus generate the SIF signal. Next, the controller 370 controls the demodulator 340 to demodulate the SIF signal to thereby generate the SSIF signal for being outputted to the audio decoder 360.

Since the format of a TV signal is unknown, an output signal may contain an audio signal if a bandwidth of the video SAW filter 320 is configured to 5.5 MHz, which can easily cause the video decoder 350 to make a wrong decision.

In step 402, the first band-pass filter 351 filters the CVBS signal based on the first center frequency configured by the controller, and the second band-pass filter 353 filters the CVBS signal based on the second center frequency configured by the controller.

In this step, the first band-pass filter 351 and the second band-pass filter 353 concurrently perform band pass filtering on the received CVBS signal. The first center frequency is greater than the second center frequency. Preferably, the first center frequency is 4.43 MHz, and the second center frequency is 3.58 MHz.

In step 403, the controller 370 determines whether the signal magnitude of the CVBS signal at the back porch at the first center frequency is greater than that at the second center frequency or not; if yes, step 404 is executed, otherwise, step 408 is executed.

In step 404, the controller 370 controls the first band-pass filter to detect signal amplitude of the CVBS signal at the synchronous tip and the back porch.

In step 405, the controller 370 determines whether the signal amplitude of the CVBS signal at the back porch is greater than that at the synchronous tip; if yes, step 406 is executed, otherwise step 411 is executed.

In step 406, the video decoder 350 is controlled by the controller 370 to decode the CVBS signal in order to select one of NTSC443, PAL, and SECAM formats as the video format of the CVBS signal.

Figure 5:
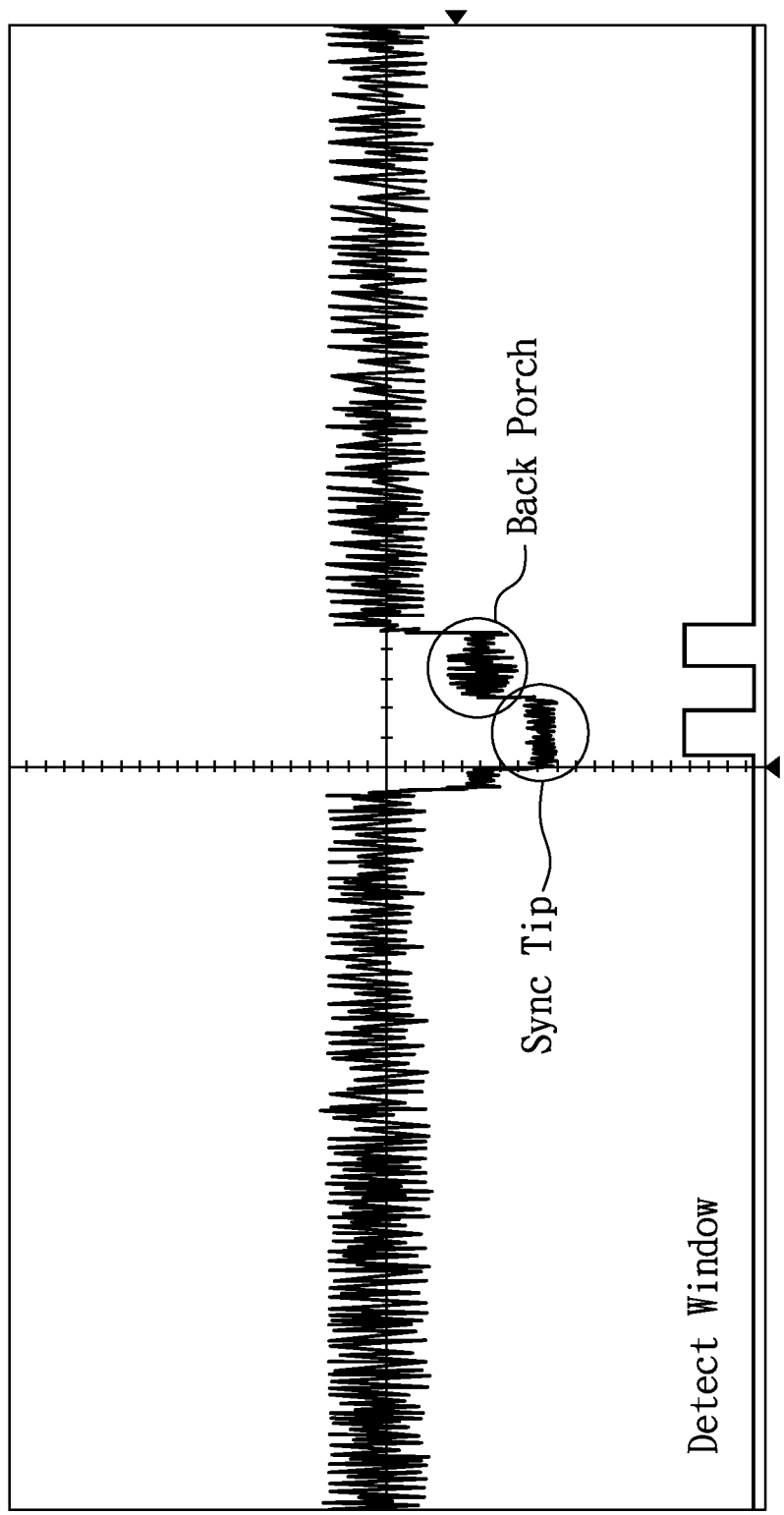
FIG. 5 is a schematic view illustrating the signal amplitude of a
CVBS signal at a synchronous tip and a back porch in accordance with an embodiment of the invention.

FIG. 5 is a schematic view illustrating the signal amplitude of a CVBS signal at a synchronous tip and a back porch in accordance with an embodiment of the invention. As shown in FIG. 5, the signal amplitude of the CVBS signal at the back porch is greater than that at the synchronous tip.

In step 407, the audio decoder 360 is controlled by the controller 370 to decode the SSIF signal in order to select one of BG, DK, and I formats as the audio format of the SSIF signal. Next, step 414 is executed.

In step 408, the video SAW filter 320 converts the received first IF signal into the video IF signal based on the second configured bandwidth configured by the controller 370.

In step 403, when the signal amplitude of the CVBS signal at the back porch at the center frequency (4.43 MHz) of the first band-pass filter 351 is smaller than or equal to that at the center frequency (3.58 MHz) of the second band-pass filter 353, the controller 370 reconfigures the video SAW filter 320 to a second configured bandwidth. Preferably, the second configured bandwidth is 4.5 MHz.

In this case, it means that the bandwidth configuration previously configured for the video SAW filter 320 in step 401 is wrong. Therefore, the bandwidth of the video SAW filter 320 is reconfigured to 4.5 MHz, and step 409 is executed.

In step 409, the video decoder 350 is controlled by the controller 370 to select one of NTSC, PAL-M, and PAL-N formats as the video format of the CVBS signal.

Step 409 further includes steps 4091 and 4092. In step 4091, the demodulator 340 demodulates the VIF signal with the changed bandwidth outputted by the video SAW filter 320 to thus generate a different composite video baseband signal (CVBS). In step 4092, the video decoder 350 decodes the different CVBS signal to select one of NTSC, PAL-M, and PAL-N formats as the video format of the different CVBS signal.

In step 410, the audio decoder 360 is controlled by the controller 370 to decode the SSIF signal in order to determine whether the audio format of the SSIF signal is one of M, BG, DK, and I formats, and then step 414 is executed.

In step 411, the video SAW filter 320 converts the received first IF signal into a VIF signal based on the second configured bandwidth configured by the controller 370.

When it is determined in step 405 that the signal amplitude of the CVBS signal at the back porch is not greater than that at the synchronous tip, the controller 370 configures the video SAW filter 320 to the second configured bandwidth (4.5 MHz) and uses the video SAW filter 320 to filter the first IF signal in order to obtain a different CVBS signal, and then step 412 is executed.

Figure 6:
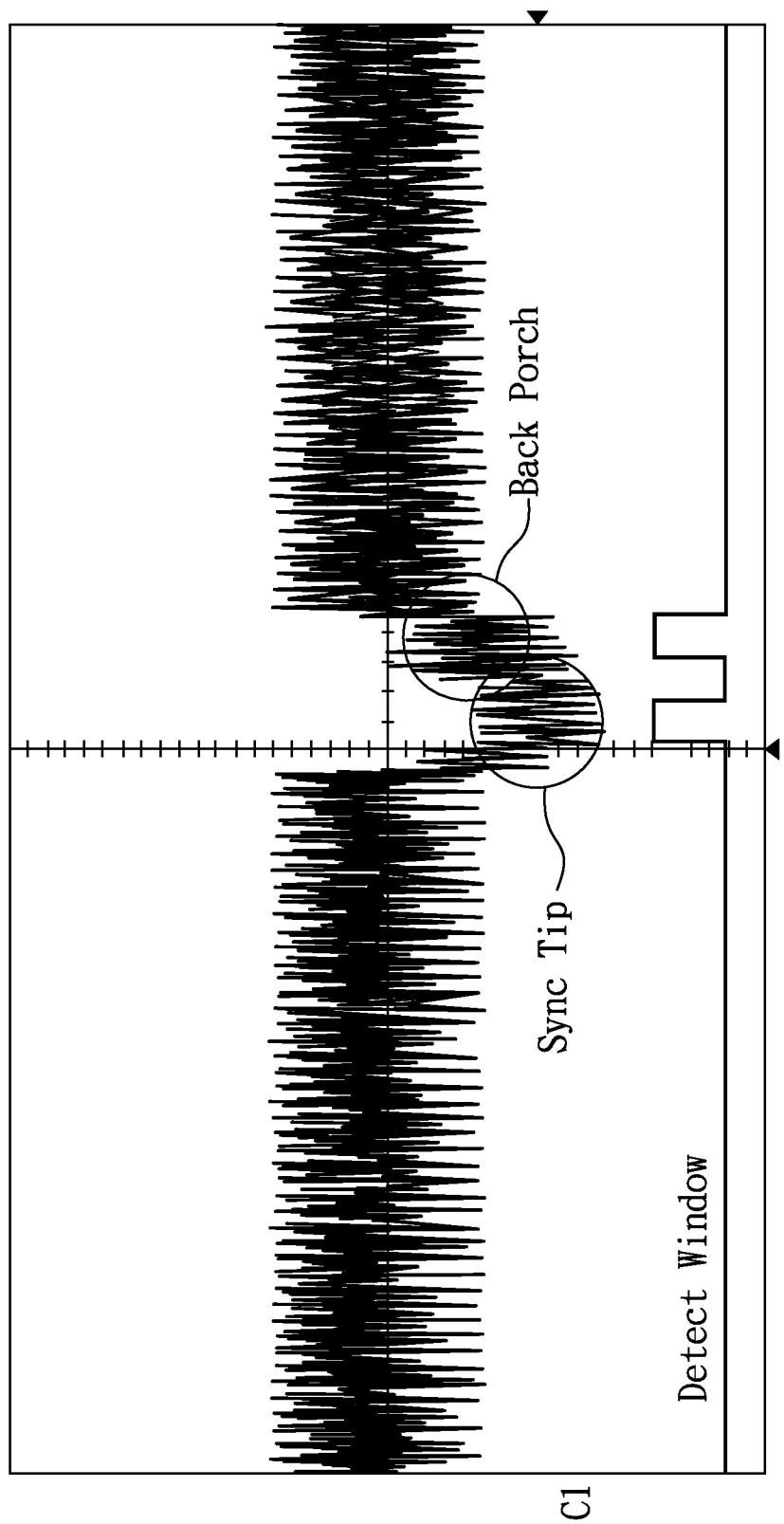
FIG. 6 is another schematic view illustrating the signal amplitude of a CVBS signal at a synchronous tip and a back porch in accordance with an embodiment of the invention.

FIG. 6 is schematic view illustrating the signal amplitude of the aforementioned different CVBS signal at a synchronous tip and a back porch in accordance with an embodiment of the invention. As shown in FIG. 6, the signal amplitude at the back porch is smaller than or equal to that at the synchronous tip.

In step 412, the video decoder 350 is controlled by the controller 370 to select one of NTSC, PAL-M, and PAL-N formats as the video format of the CVBS signal.

Step 412 further includes steps 4121 and 4122. In step 4121, the demodulator 340 demodulates the VIF signal with the changed bandwidth outputted by the video SAW filter 320 to thus generate a different composite video baseband signal (CVBS). In step 4122, the video decoder 350 decodes the different CVBS signal to select one of NTSC, PAL-M, and PAL-N formats as the video format of the different CVBS signal.

In step 413, the audio decoder 360 is controlled by the controller 370 to decode the received SSIF signal in order to select one of M and N formats as the audio format of the SSIF signal.

Step 414 ends the procedure.

In this embodiment, the video decoder 350 can use an existing scheme to determine the video format of a decoded signal, and the audio decoder 360 can use an exiting scheme to determine the audio format of a decoded signal. The processes of determining the video and audio formats are no more repeated herein.

In view of forgoing, the invention provides a simple and automatic method and apparatus to automatically select the audio format outputted by the tuner 310. When the tuner 310 scans channels, the video SAW filter 320 is configured to a 5.5 MHz bandwidth first, and uses a band-pass filter with a center frequency of 4.43 MHz and a horizontal synchronous signal to detect the amplitude of a signal at both synchronous tip and back porch. When the signal around 4.5 MHz is an M/N audio signal, the amplitude of the signal at both synchronous tip and back porch are about equal; but when the signal around 4.5 MHz is a video signal, the amplitude of the signal at back porch is greater than that at synchronous tip because the signal at synchronous tip does not present a color burst signal. Thus, the audio format outputted by the tuner can be automatically detected.

Although the present invention has been explained in relation to its preferred embodiment, it is to be understood that many other possible modifications and variations can be made without departing from the spirit and scope of the invention as hereinafter claimed.

What is claimed is:

1. A method of automatically selecting audio format for output signal of a tuner in a television system, the method comprising the steps of:

(A) a video surface acoustic wave (SAW) filter converting a first intermediate frequency (IF) signal outputted by the tuner into a video intermediate frequency (VIF) signal based on a first configured bandwidth configured by a controller; an audio SAW filter converting the first IF signal into an sound intermediate frequency (SIF) signal under control of the controller; a demodulator demodulating the VIF signal to obtain a composite video baseband signal (CVBS) and demodulating the SIF signal to obtain a second sound intermediate frequency (SSIF) signal under control of the controller;

(B) a video decoder having a first band-pass filter and a second band-pass filter simultaneously filtering the CVBS signal based on a center frequency configured by the controller, wherein the center frequency of the first band-pass filter is greater than the center frequency of the second band-pass filter;

(C) the controller determining whether the CVBS signal at the center frequency of the first band-pass filter has a signal amplitude greater than that of the second band-pass filter, and executing step (D) when the CVBS signal at the center frequency of the first band-pass filter has the signal amplitude greater than that of the second band-pass filter, otherwise executing step (E);

(D) the controller controlling the first band-pass filter to detect a signal amplitude of the CVBS signal at a synchronous tip and a back porch and determining whether the signal amplitude of the CVBS signal at the back porch is greater than that at the synchronous tip, the video decoder being controlled by the controller to decode a received CVBS signal and to select one of NTSC443, PAL, and SECAM formats as a video format of the CVBS signal when the signal amplitude of the received CVBS signal at the back porch is greater than that at the synchronous tip, and an audio decoder being controlled by the controller to decode a received SSIF signal and to select one of BG, DK, and I formats as an audio format of the received SSIF signal when the signal amplitude of the received CVBS signal at the back porch is greater than that at the synchronous tip, otherwise executing step (F);

(E) the video surface acoustic wave (SAW) filter converting the first intermediate frequency (IF) signal outputted by the tuner into the video intermediate frequency (VIF) signal based on a second configured bandwidth configured by the controller and decoding a second received CVBS signal to select one of NTSC, PAL-M, and PAL-N formats as a video format of the second received CVBS signal under control of the controller, and the audio decoder decoding a second received SSIF signal to select one of M, BG, DK, and I formats as an audio format of the second received SSIF signal under control of the controller; and (F) the video SAW filter converting the first IF signal outputted by the tuner into the VIF signal based on the second configured bandwidth, the video decoder decoding the second received CVBS signal to select one of NTSC, PAL-M, and PAL-N formats as the video format of the second received CVBS signal under control of the controller, the audio decoder decoding the second received SSIF signal to select one of M and N formats as the audio format of the second received SSIF signal under control the controller.

2. The method as claimed in claim 1, wherein the center frequency of the first band-pass filter is 4.43 MHz, and the center frequency of the second band-pass filter is 3.58 MHz.

3. The method as claimed in claim 1, wherein the first configured bandwidth is 5.5 MHz, and the second configured bandwidth is 4.5 MHz.

4. An apparatus of automatically selecting audio format for output signal of a tuner in a television system, comprising:

the tuner for receiving a radio frequency (RF) signal and converting the RF signal into a first intermediate frequency (IF) signal;

a video surface acoustic wave (SAW) filter for converting the first IF signal into a video IF (VIF) signal based on a first configured bandwidth or a second configured bandwidth;

an audio SAW filter for converting the first IF signal into a sound IF (SIF) signal;

a demodulator for demodulating the VIF signal so as to generate a composite video baseband signal (CVBS) and demodulating the SIF signal so as to generate a second sound intermediate frequency (SSIF) signal;

a video decoder for decoding the CVBS signal based on a center frequency for determining a video format of the CVBS signal, the video decoder including a first band-pass filter and a second band-pass filter, wherein the first band-pass filter and the second band-pass filter simultaneously filter the CVBS signal for output based on a center frequency, and the center frequency of the first band-pass filter is greater than the center frequency of the second band-pass filter;

an audio decoder for decoding the SSIF signal to determine an audio format of the SSIF signal;

a controller connected to the tuner, the video SAW filter, the audio SAW, the demodulator, the first band-pass filter of the video decoder, the second band-pass filter of the video decoder, and the audio decoder for first configuring the video SAW filter to the first configured bandwidth, then configuring the video SAW filter to the second configured bandwidth when a signal amplitude at the center frequency of the first band-pass filter is smaller than or equal to that at the second band-pass filter for the CVBS signal, and finally controlling the video decoder to select one of NTSC, PAL-M, and PAL-N formats as a video format of a second received CVBS signal and controlling the audio decoder to select one of M, BG, DK, and I formats as an audio format of a second received SSIF signal, wherein the controller controls the first band-pass filter to detect a signal amplitude of the CVBS signal at a synchronous tip and a back porch when the signal amplitude of the CVBS signal at the center frequency of the first band-pass filter is greater than that at the center frequency of the second band-pass filter;

the controller controls the video decoder to decode the CVBS signal to select one of NTSC443, PAL, and SECAM formats as the video format of the CVBS signal and also controls the audio decoder to decode the SSIF signal to select one of BG, DK, and I formats as an audio format of a second received SSIF signal, when it is determined by the controller that the signal amplitude of the CVBS signal at the back porch is greater than that at the synchronous tip, the controller reconfigures the video SAW filter to the second configured bandwidth for controlling the video decoder to reselect one of NTSC, PAL-M, and PAL-N formats as the video format of the second received CVBS signal and controlling the audio decoder to reselect one of M and N formats as the audio format of the second received SSIF signal, when it is determined by the controller that the signal amplitude of the CVBS signal at the back porch is smaller than or equal to that at the synchronous tip.

5. The apparatus as claimed in claim 4, wherein the center frequency of the first band-pass filter is 4.43 MHz, and the center frequency of the second band-pass filter is 3.58 MHz.

6. The apparatus as claimed in claim 4, wherein the first configured bandwidth is 5.5 MHz, and the second configured bandwidth is 4.5 MHz.

* * * * *